(12) United States Patent
Eigel et al.

(10) Patent No.: US 11,807,239 B2
(45) Date of Patent: Nov. 7, 2023

(54) SYSTEM AND METHOD FOR PERFORMING A LANE CHANGE

(71) Applicant: Volkswagen Aktiengesellschaft, Wolfsburg (DE)

(72) Inventors: Thomas Eigel, Berlin (DE); Felix Kallmeyer, Wolfsburg (DE)

(73) Assignee: Volkswagen Aktiengesellschaft, Wolfsburg (DE)

( * ) Notice: Subject to any disclaimer, the term of this patent is extended or adjusted under 35 U.S.C. 154(b) by 195 days.

(21) Appl. No.: 16/717,560

(22) Filed: Dec. 17, 2019

(65) Prior Publication Data

US 2020/0189598 A1 Jun. 18, 2020

(30) Foreign Application Priority Data

Dec. 17, 2018 (DE) .......................... 102018221860.9

(51) Int. Cl.
*B60W 30/18* (2012.01)
*B60W 30/16* (2020.01)
*B60W 50/04* (2006.01)
*B60W 50/14* (2020.01)

(52) U.S. Cl.
CPC .... *B60W 30/18163* (2013.01); *B60W 30/162* (2013.01); *B60W 50/14* (2013.01); *B60W 2554/404* (2020.02); *B60W 2554/801* (2020.02); *B60W 2554/804* (2020.02)

(58) Field of Classification Search
CPC ......... B60W 30/18163; B60W 30/162; B60W 50/14; B60W 2554/804; B60W 2554/404; B60W 2554/801
See application file for complete search history.

(56) References Cited

U.S. PATENT DOCUMENTS

| 5,521,579 A | * | 5/1996 | Bernhard | ........ B60W 30/18163 340/438 |
| 5,529,139 A | * | 6/1996 | Kurahashi | ........... B60W 30/146 318/587 |
| 6,438,491 B1 | * | 8/2002 | Farmer | ..................... G01S 7/41 340/436 |

(Continued)

FOREIGN PATENT DOCUMENTS

| DE | 19843395 A1 | 3/2000 |
| DE | 10349433 B4 | 6/2004 |

(Continued)

*Primary Examiner* — Fadey S. Jabr
*Assistant Examiner* — Naeem Taslim Alam
(74) *Attorney, Agent, or Firm* — Peter Zura; LOZA & LOZA, LLP

(57) ABSTRACT

Technologies and techniques for automatically preparing and/or executing a possible lane change with an ego vehicle traveling in moving traffic from a first lane to a second lane of a multi-lane roadway by means of a driver assistance system and to a driver assistance system. Gaps are detected between two vehicles, and the relative positions and movements of the gaps relative to the ego vehicle will facilitate a potential lane change of the ego vehicle. The driver assistance system adjusts the following distance and/or following speed of the ego vehicle relative to the vehicle ahead in such a way that changing a lane and merging into a gap of an adjacent lane is possible by means of a transverse guidance of the ego vehicle.

20 Claims, 3 Drawing Sheets

(56) References Cited

U.S. PATENT DOCUMENTS

| | | | |
|---|---|---|---|
| 6,580,996 B1 | 6/2003 | Friedrich | |
| 9,766,629 B1* | 9/2017 | Konchan | G08G 1/167 |
| 10,089,876 B1* | 10/2018 | Ramasamy | G05D 1/028 |
| 10,279,808 B2* | 5/2019 | Drown | B60W 10/18 |
| 10,730,521 B2* | 8/2020 | Likhachev | B60W 30/18163 |
| 10,977,882 B1* | 4/2021 | Nguyen | B60W 50/14 |
| 10,991,242 B2* | 4/2021 | Taylor | H04Q 9/00 |
| 2003/0052810 A1* | 3/2003 | Artis | H01Q 1/44 |
| | | | 343/872 |
| 2006/0149455 A1* | 7/2006 | Sawada | B60T 7/22 |
| | | | 701/96 |
| 2009/0271084 A1 | 10/2009 | Taguchi | |
| 2009/0276135 A1 | 11/2009 | Hagemann et al. | |
| 2010/0256852 A1* | 10/2010 | Mudalige | G08G 1/164 |
| | | | 701/24 |
| 2011/0006913 A1* | 1/2011 | Chen | G08G 1/161 |
| | | | 340/902 |
| 2015/0166062 A1* | 6/2015 | Johnson | G08G 1/167 |
| | | | 701/41 |
| 2015/0232094 A1* | 8/2015 | Sudou | B60W 30/16 |
| | | | 701/93 |
| 2015/0360721 A1* | 12/2015 | Matsuno | B60W 30/18163 |
| | | | 701/1 |
| 2016/0185388 A1* | 6/2016 | Sim | B60W 10/04 |
| | | | 701/41 |
| 2016/0304080 A1* | 10/2016 | Sugiyama | B60W 20/12 |
| 2017/0001639 A1* | 1/2017 | Dempsey | G08G 1/16 |
| 2017/0082452 A1* | 3/2017 | Sumizawa | B60W 60/001 |
| 2017/0248959 A1* | 8/2017 | Matsubara | B60W 30/12 |
| 2018/0029595 A1* | 2/2018 | Pan | B60W 50/10 |
| 2018/0101172 A1* | 4/2018 | Min | G01C 21/3896 |
| 2018/0178796 A1* | 6/2018 | Fukuda | B60W 30/16 |
| 2018/0215387 A1* | 8/2018 | Takae | B62D 15/0265 |
| 2018/0218713 A1* | 8/2018 | Kusanagi | G06T 11/60 |
| 2018/0244275 A1* | 8/2018 | Bremkens | G08G 1/0968 |
| 2018/0267557 A1* | 9/2018 | Yan | B60W 50/0098 |
| 2018/0357904 A1* | 12/2018 | Miyata | B60W 30/18163 |
| 2019/0143983 A1* | 5/2019 | Hashimoto | B60W 10/20 |
| | | | 701/23 |
| 2019/0315360 A1* | 10/2019 | Kim | B60W 50/0098 |
| 2019/0367041 A1* | 12/2019 | Nakano | G06F 21/554 |
| 2019/0382021 A1* | 12/2019 | Niibo | B60W 10/20 |
| 2020/0031349 A1* | 1/2020 | Jia | B60W 30/16 |
| 2020/0098266 A1* | 3/2020 | Tanaka | B60R 21/00 |
| 2020/0276972 A1* | 9/2020 | Ito | B60W 30/146 |
| 2020/0388164 A1* | 12/2020 | Domprobst | G05D 1/0297 |
| 2021/0162999 A1* | 6/2021 | Lucas | B60W 40/08 |

FOREIGN PATENT DOCUMENTS

| | | |
|---|---|---|
| DE | 102005017560 A1 | 10/2006 |
| DE | 102007031420 A1 | 1/2009 |
| DE | 102011016770 A1 | 11/2011 |
| DE | 102010041620 A1 | 3/2012 |
| DE | 102010042440 A1 | 4/2012 |
| DE | 102012214979 A1 | 2/2014 |
| DE | 102015208697 A1 | 11/2016 |
| GB | 2489089 A | 4/2012 |
| WO | 2005123439 A1 | 12/2005 |
| WO | 2017171040 A1 | 10/2017 |

* cited by examiner

SYSTEM AND METHOD FOR PERFORMING A LANE CHANGE

RELATED APPLICATIONS

The present application claims priority under 35 U.S.C. § 119 to German Pat. App. No. DE 102018221860.9, titled "Process and Assistance System for Preparing and/or Executing a Lane Change," filed Dec. 17, 2018, the contents of which is incorporated by reference in its entirety herein.

TECHNICAL FIELD

The present invention relates to a process for automatically preparing and/or executing a possible lane change with an ego vehicle traveling in moving traffic from a first lane to a second lane of a multi-lane roadway by means of a driver assistance system.

BACKGROUND

The present disclosure relates to a driver assistance system for executing said process.

The prior art teaches diverse driver assistance systems that actively influence the vehicle guidance and support the driver, particularly in critical situations. Aside from added safety, known driver assistance system also result in more comfort because the vehicle guidance requires only a minimal measure of attention by the driver.

Known in the art are, for example, driver assistance systems that maintain a constant distance in dense traffic (in terms of time and/or space) relative to a vehicle ahead, thereby ensuring that the driver, while traveling in stop-and-go traffic, must not personally execute braking and subsequent accelerating processes. When a lane change is initiated by means of such driver assistance systems, the adjusted and preset following distance relative to the vehicle ahead is temporarily reduced to allow for an acceleration process in the current lane of travel to then change lanes at an elevated (or possibly reduced) differential speed to the other lane and merge with the moving traffic in that lane.

DE 10 2007 031 420 A1 teaches a further driver assistance system that relates to the longitudinal guidance of a vehicle and provides for adjusting a situationally adapted distance regulation.

DE 10 2005 017 560 A1 and US 2009/0271084 A1 disclose additional driver assistance systems.

SUMMARY

Starting with known driver assistance systems as a basis, it is an object of the present invention to propose a process and a driver assistance system for executing said process that will further improve driving safety and driving comfort on multi-lane roadways.

BRIEF DESCRIPTION OF THE DRAWINGS

Specific embodiments of the present invention will be described below based on the figures. Shown are as follows.

DETAILED DESCRIPTION

Figure 1:
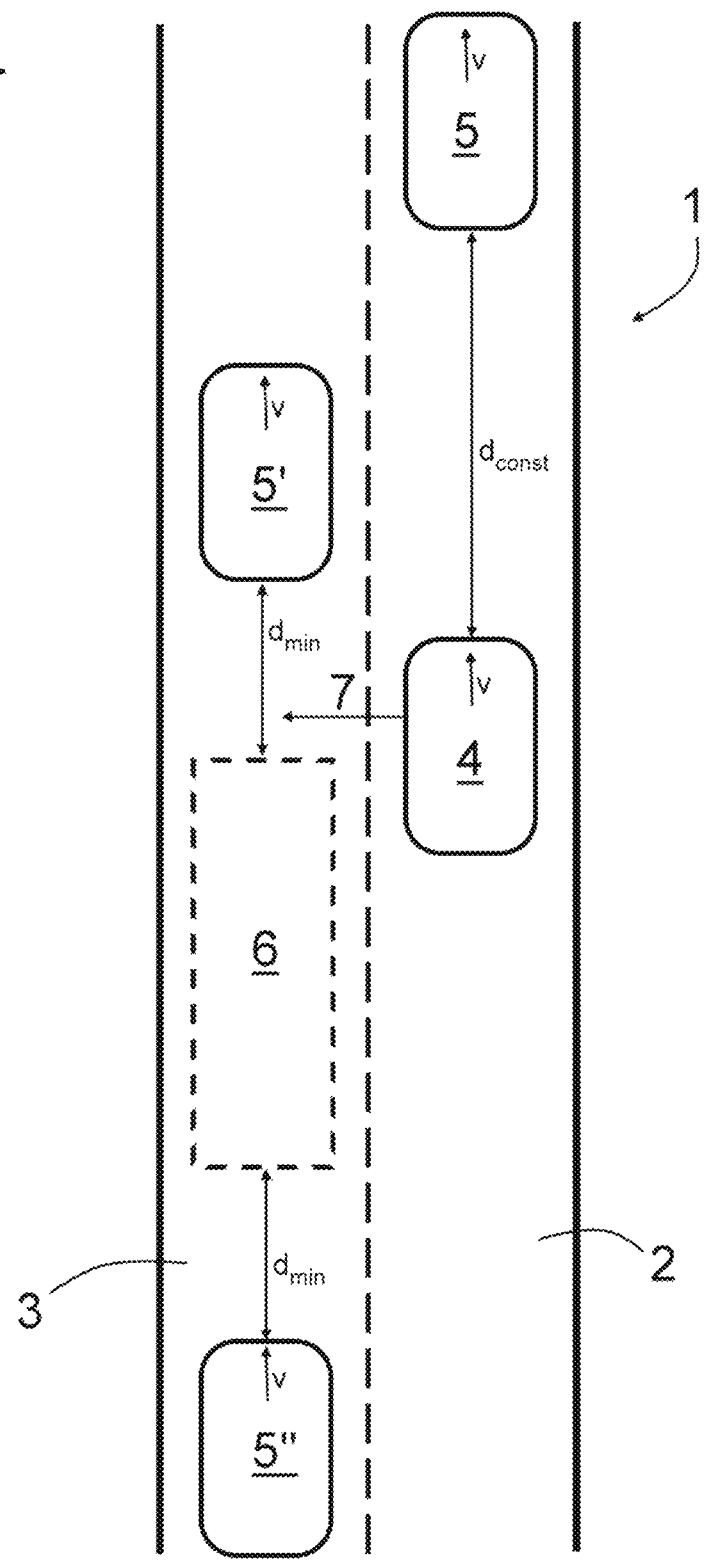
FIGS. 1 and 2 illustrate driving situations on a multi-lane roadway under exemplary embodiments.

In various embodiments, the present disclosure illustrates a driver assistance system that detects gaps relative to the ego vehicle in the adjacent lanes of a first lane between two vehicles traveling, one behind the other, and the relative positions and movements of the gaps that will facilitate a potential lane change by the ego vehicle. The driver assistance system will also adjust the following distance and/or following speed of the ego vehicle relative to the vehicle ahead in such a manner that it is possible to execute a lane change and merge into a gap in an adjacent lane by means of a transverse guidance of the ego vehicle.

In some illustrative embodiments a sensor unit may monitor the following distance and the following speed relative to the vehicle ahead, and detecting gaps between two subsequent vehicles in adjacent lanes of a multi-lane roadway.

In some illustrative embodiments, a process and a driver assistance system is disclosed for executing processes that will simplify lane changes, particularly in dense traffic, in that the following distance and the following speed, relative to the vehicle ahead are adjusted with such a degree of variability that the ego vehicle travels directly next to a gap in an adjacent lane and from where the ego vehicle can be steered automatically or manually and merge by means of a transverse guidance. This means, when executing a desired or necessary lane change, the driver does not personally adjust the following distance and the following speed relative to the traffic in the adjacent lane, while simultaneously scanning the traffic behind him in search of suitable gaps for merging. This will improve driving safety as well as driving comfort during lane changes.

In some illustrative embodiments, the driver assistance system signals an optional lane change by means of a signal means, when a sufficiently large gap has been detected in the moving traffic of an adjacent lane, facilitating a lane change and merging into a gap by means of a transverse guidance of the ego vehicle. A suitable signal can be, for example, an acoustic signal or an announcement like "a lane change to the left (or right) is possible." Also envisioned are light signals that visualize the option of a lane change with a corresponding sign.

When searching for gaps of where the ego vehicle can merge into adjacent lanes, it is preferably provided that the ego vehicle does not fall below a minimum following distance $d_1$ relative to the vehicles ahead and/or exceed a maximum following distance $d_2$ relative to the vehicle ahead. First, this way, it is avoided that the ego vehicle follows the traffic ahead too closely and/or itself creates a gap that would cause traffic to stall. The minimum following distance $d_1$ relative to the vehicle ahead is selected as a function of the speed and the maximum following distance $d_2$ relative to the vehicle ahead is selected as a function of the speed, or it is pre-adjustable.

To avoid repeated accelerating and breaking, when aligning with gaps in adjacent lanes for merging in case of an undesired lane change in moving traffic, a preferred embodiment of the invention provides that the process and/or the feature associated therewith within the driver assistance system can be activated and deactivated by the driver and/or automatically.

This way, a constant distance can be maintained relative to the vehicle ahead during an undesired lane change, which provides a high level of driving comfort and better energy efficiency.

The process disclosed herein is preferably activated automatically when the analysis of predictive route data and/or swarm data of other vehicles in the immediate vicinity, which is performed by an analysis unit, yields a finding of a traffic situation ahead with an obligatory lane change. A traffic situation of this kind results, for example, when a lane narrows or in the event of a scheduled turn-off, for example, at an exit. The predictive route data can result from GPS data of the planned route or from current traffic reports. For the analysis of swarm data, it is possible to use data that result, for example, from car2car communications. In such a case, if a situation emerges where, for example, one lane of a multi-lane roadway is blocked or ends, the ego vehicles automatically arranges itself in the moving traffic in such a way that a gap is positioned in the adjacent lane, where the ego vehicle can then merge by means of a transverse guidance. When a plurality of vehicles have such a driver assistance system that is set up for executing the present process, it will facilitate an automated alternate merging process, thereby visibly reducing otherwise common traffic backups ahead of a narrowing of a lane, because any need for coordination between drivers and the usual struggle of who gets to go first is avoided.

Turning to FIG. 1, the drawing shows a conventional driving situation on a two-lane roadway 1 having a right lane 2 and a left lane 3, wherein the ego vehicle 4, which has a driver assistance system, travels at a constant following distance $d_{const}$ behind a vehicle ahead 5. Also, two vehicles 5',5" travel in the left lane 3, which have a gap 6 between them into which the ego vehicle 4 could merge from the right line 2 without violating a minimum safety distance $d_{min}$ relative to the vehicles 5', 5". All vehicles 4, 5, 5', 5" involved in the present traffic situation are traveling at the same speed v. In the shown situation, it is not possible for the ego vehicle 4 to change lanes solely by means of a transverse guidance of vehicle 4 in the direction of the arrow 7 because a safety distance $d_{min}$ relative to the vehicle ahead 5' in the left lane 3 would be violated. Accordingly, for a desired lane change, the ego vehicle 4 must first be decelerated and then accelerated again to position the ego vehicle 4 for a lane change next to the gap 6.

Figure 2:
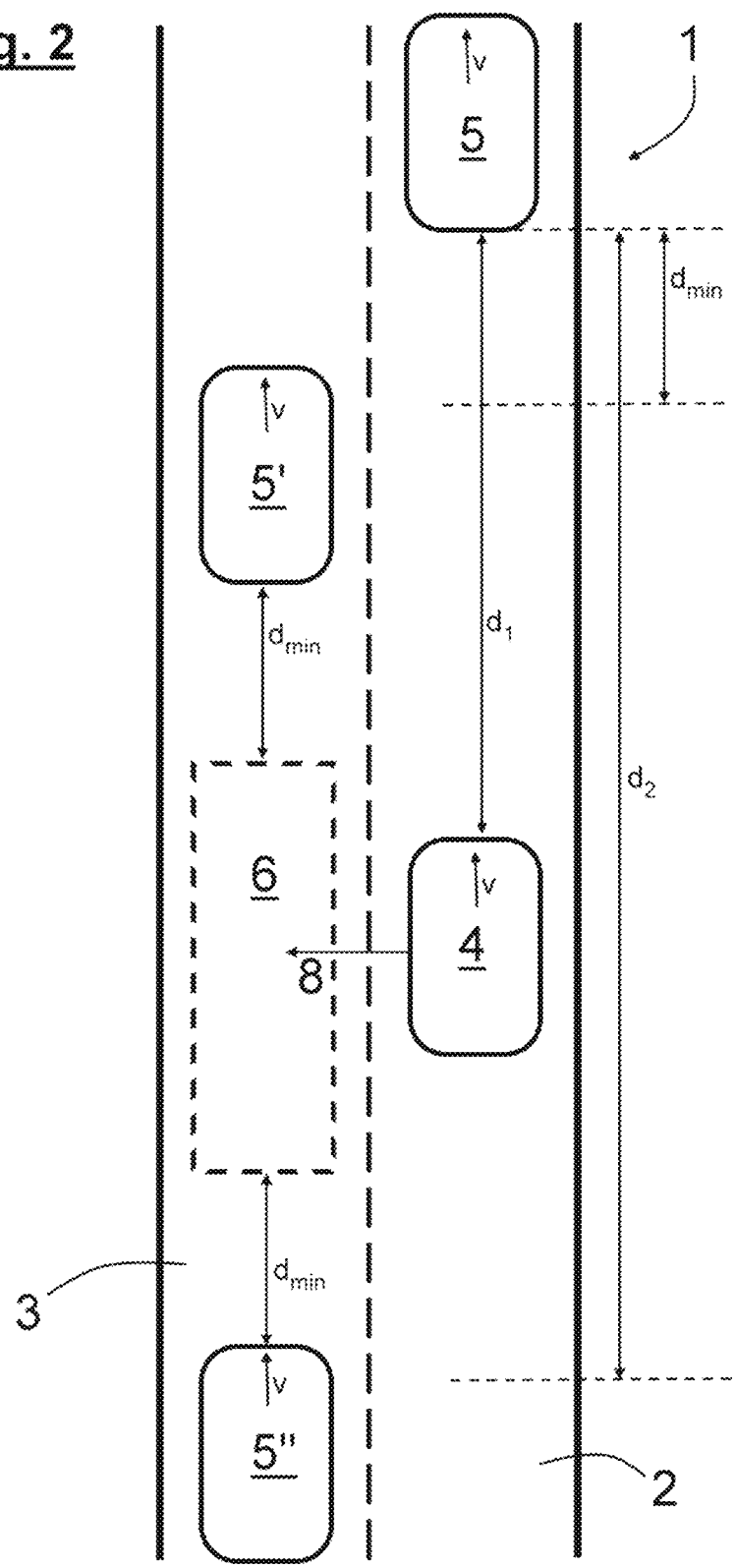

FIG. 2 shows the same situation, but here the ego vehicle 4 is equipped with a driver assistance system according to the invention. The driver assistance system automatically detects the available gap 6 in the left lane 3 and can adjust its own relative position and speed within certain limits in such a way that the ego vehicle 4 is arranged directly next to the registered gap. During this process, a minimum safety distance $d_{min}$ relative to the vehicle ahead 5 and a maximum following distance $d_2$ are not violated. In this situation (as depicted in FIG. 2), it is possible to execute a lane change as needed, automatically or manually, by means of a transverse guidance of the ego vehicle 4 in the direction of the arrow 8.

Figure 3:
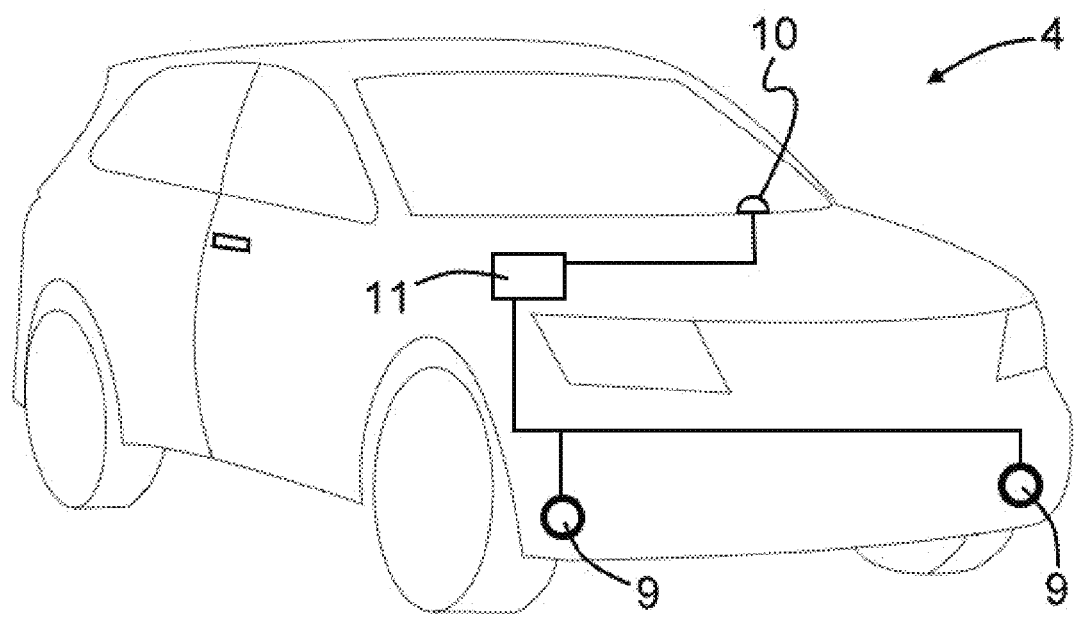
FIG. 3 illustrates an ego vehicles with a driver assistance system under an exemplary embodiment.

FIG. 3 is an exemplary depiction of an ego vehicle 4 that has a driver assistance system that is set up to execute the process according to the invention. To this end, the ego vehicle 4 is equipped with a sensor unit 9 that monitors, aside from the following distance $d_1$ relative to the vehicle ahead 5, also the traffic in the adjacent lanes 2, 3, particularly in such a way that any gaps 6 between the two vehicles 5', 5 are detected for a potential lane change. To indicate a potential lane change, the ego vehicle 4 is equipped with a signal means 10, which is depicted as a light sign in the shown embodiment and visualizes a potential lane change in green and a blocked lane in red. For controlling the process and analyzing swarm data or other predictive route data, the ego vehicle 4 is equipped with an analysis unit 11 that is connected to the signal unit 10 and the sensor unit 9.

LIST OF REFERENCE SIGNS

1 Two-lane roadway
2 Right lane
3 Left lane
4 Ego vehicle
5, 5', 5" Vehicle
6 Gap
7 Direction of arrow
8 Direction of arrow
9 Sensor unit
10 Signal means
11 Analysis unit
$d_1$ Following distance
$d_2$ Maximum following distance
$d_{const}$ Constant following distance
$d_{min}$ Safety distance
v Speed

The invention claimed is:

1. A method for automatically configuring a lane change from a first lane with an ego vehicle, comprising:
    activating a driver assistance system in the ego vehicle during ego vehicle operation to transition the ego vehicle operation from a manual operating mode to a driver-assisted mode for executing the lane change;
    detecting, via a sensor system, a gap between a first vehicle traveling in front of a second vehicle in a second lane after the driver assistance system is activated;
    detecting, via the sensor system, a gap size of the detected gap, wherein the gap size comprises (i) a gap space for the ego vehicle, (ii) a first safety distance for the first vehicle in the second lane relative to the gap space, and (iii) a second safety distance for the second vehicle in the second lane relative to the gap space;
    detecting, via the sensor system, (i) a minimum following distance between the ego vehicle and another vehicle in front of the ego vehicle in the first lane, and (ii) a maximum following distance between the ego vehicle and the another vehicle, wherein the maximum following distance is further configured to meet the second safety distance;
    adjusting, via the driver assistance system, a following speed of the ego vehicle relative to the another vehicle, such that the ego vehicle is positioned in the area of the gap size without violating the minimum following distance and maximum following distance; and
    facilitating, via the driver assistance system, a lane change into the gap size based on the adjusting, utilizing a transverse guidance.

2. The method of claim 1, wherein activating the driver assistance system comprises activating the driver assistance system in response to receiving a signal comprising at least one of predictive route data and/or swarm data in the area of the ego vehicle indicating an obligatory lane change in a vicinity of the ego vehicle.

3. The method of claim 2, wherein the signal comprises a car2car communication.

4. The method of claim 1, further comprising deactivating the driver assistance system after the lane change is facilitated.

5. The method of claim 1, wherein the detecting the gap comprises detecting the gap in an area behind the ego vehicle.

6. The method of claim 1, wherein the minimum following distance and maximum following distance are detected as a function of speed.

7. The method of claim 1, further comprising signaling, via the driver assistance system, an upcoming lane change, prior to facilitating the lane change into the gap size.

8. A system for automatically configuring a lane change from a first lane with an ego vehicle, comprising:
- a sensor system;
- a driver assistance system operatively coupled to the sensor system, wherein the sensor system and driver assistance system are configured to
  - activate the driver assistance system in the ego vehicle during ego vehicle operation to transition the ego vehicle operation from a manual operating mode to a driver-assisted mode for executing the lane change;
  - detect, via the sensor system, a gap between a first vehicle traveling in front of a second vehicle in a second lane after the driver assistance system is activated;
  - detect, via the sensor system, a gap size of the detected gap, wherein the gap size comprises (i) a gap space for the ego vehicle, (ii) a first safety distance for the first vehicle in the second lane relative to the gap space, and (iii) a second safety distance for the second vehicle in the second lane relative to the gap space;
  - detect, via the sensor system, (i) a minimum following distance between the ego vehicle and another vehicle in front of the ego vehicle in the first lane, and (ii) a maximum following distance between the ego vehicle and the another vehicle, wherein the maximum following distance is further configured to meet the second safety distance;
  - adjust, via the driver assistance system, a following speed of the ego vehicle relative to the another vehicle, such that the ego vehicle is positioned in the area of the gap size without violating the minimum following distance and maximum following distance; and
  - facilitate, via the driver assistance system, a lane change into the gap size based on the adjusting, utilizing a transverse guidance.

9. The system of claim 8, wherein the driver assistance system is configured to activate the driver assistance system by activating the driver assistance system in response to receiving a signal comprising at least one of predictive route data and/or swarm data in the area of the ego vehicle indicating an obligatory lane change in a vicinity of the ego vehicle.

10. The system of claim 9, wherein the signal comprises a car2car communication.

11. The system of claim 8, wherein the driver assistance system is configured to deactivate the driver assistance system after the lane change is facilitated.

12. The system of claim 8, wherein the sensor system is configured to detect the gap by detecting the gap in an area behind the ego vehicle.

13. The system of claim 8, wherein the minimum following distance and maximum following distance are detected as a function of speed.

14. The system of claim 8, wherein the drivers assistance system is configured to signal an upcoming lane change, prior to facilitating the lane change into the gap size.

15. A method for automatically configuring a lane change from a first lane with an ego vehicle, comprising:
- activating a driver assistance system in the ego vehicle during ego vehicle operation to transition the ego vehicle operation from a manual operating mode to a driver-assisted mode for executing the lane change;
- detecting, via a sensor system, a gap between a first vehicle traveling in front of a second vehicle in a second lane after the driver assistance system is activated;
- detecting, via the sensor system, a gap size of the detected gap, wherein the gap size comprises (i) a gap space for the ego vehicle in an area behind the ego vehicle, (ii) a first safety distance for the first vehicle in the second lane relative to the gap space, and (iii) a second safety distance for the second vehicle in the second lane relative to the gap space;
- detecting, via the sensor system, (i) a minimum following distance between the ego vehicle and another vehicle in front of the ego vehicle in the first lane, and (ii) a maximum following distance between the ego vehicle and the another vehicle, wherein the maximum following distance is further configured to meet the second safety distance;
- adjusting, via the driver assistance system, a following speed of the ego vehicle relative to the another vehicle, such that the ego vehicle is positioned in the area of the gap size without violating the minimum following distance and maximum following distance; and
- facilitating, via the driver assistance system, a lane change into the gap size based on the adjusting, utilizing a transverse guidance.

16. The method of claim 15, wherein activating the driver assistance system comprises activating the driver assistance system in response to receiving a signal comprising at least one of predictive route data and/or swarm data in the area of the ego vehicle indicating an obligatory lane change in a vicinity of the ego vehicle.

17. The method of claim 16, wherein the signal comprises a car2car communication.

18. The method of claim 15, further comprising deactivating the driver assistance system after the lane change is facilitated.

19. The method of claim 15, wherein the minimum following distance and maximum following distance are detected as a function of speed.

20. The method of claim 15, further comprising signaling, via the driver assistance system, an upcoming lane change, prior to facilitating the lane change into the gap size.

* * * * *